(12) United States Patent
Furuhata et al.

(10) Patent No.: US 6,317,704 B1
(45) Date of Patent: Nov. 13, 2001

(54) METHOD FOR GENERATING A MESH AND A COMPUTER THEREFOR

(75) Inventors: Tomotake Furuhata, Yokohama; Takayuki Itoh, Kawasaki; Keisuke Inoue, Sagamihara; Atsuski Yamada, Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/148,968

(22) Filed: Sep. 5, 1998

(30) Foreign Application Priority Data

Sep. 5, 1997 (JP) .................................................. 9-240858

(51) Int. Cl.[7] .................................................. G06F 17/50
(52) U.S. Cl. ..................... 703/2; 703/5; 703/8; 345/423; 345/425
(58) Field of Search ...................... 703/5, 8, 2; 345/423, 345/425; 700/57

(56) References Cited

U.S. PATENT DOCUMENTS

| | | | |
|---|---|---|---|
| 5,649,081 | * 7/1997 | Nakajima et al. | 395/130 |
| 5,808,620 | * 9/1998 | Doi et al. | 345/426 |
| 6,034,691 | * 7/2000 | Aono et al. | 345/425 |
| 6,121,973 | * 9/2000 | Itoh et al. | 345/423 |
| 6,124,857 | * 9/2000 | Itoh et al. | 345/423 |

OTHER PUBLICATIONS

Shimada and Gossard, "Bubble Mesh: Automated Triangular Meshing of Non–Manifold Geometry by Sphere Packing," ACM 1995, 409–19.*

* cited by examiner

Primary Examiner—Kevin J. Teska
Assistant Examiner—Thai Phan
(74) Attorney, Agent, or Firm—Ronald L. Drumheller

(57) ABSTRACT

A method is provided for generating a quadrilateral mesh and a hexahedral mesh. First, a geometric model, which is an object of meshing, is input. The model is either two-dimensional or three-dimensional. Multiple bubbles of a plurality of types are generated in a region of the geometric model. The bubbles are moved according to an interbubble force defined by a predetermined rule, and the bubble count is controlled to adjust a neighboring relationship between the bubbles, so that the stable allocation of the bubbles are determined. By connecting the centers of bubbles of a specific type, a mesh is generated.

17 Claims, 9 Drawing Sheets

METHOD FOR GENERATING A MESH AND A COMPUTER THEREFOR

BACKGROUND OF THE INVENTION

1. Field of the Invention

The present invention relates to a mesh generation method, and in particular to a mesh generation method employing bubbles.

2. Related Art

Meshing, or mesh generation, is a process for dividing a geometric model generated by CAD etc. into a set of small elements. Mainly, a triangle mesh and a quadrilateral mesh are used for a two-dimensional mesh. In a computer simulation, such as an analysis of a car collision, since a reliable solution can not be obtained by using a triangle mesh, a quadrilateral mesh is frequently employed. However, while techniques, such as a bubble meshing method, are established for the automatic generation of a triangle mesh, as described in, for example, Japanese Unexamined Patent Publication Nos. Hei 7-230487 and Hei 8-315183, most of the techniques for the automatic generation of a quadrilateral mesh are not adequate for practical use. Therefore, many analysts generate a quadrilateral mesh by using a method that needs the expenditure of an enormous amount of human labor over several months to obtain CAD data for one car, for example.

While in the heat/fluid analysis field there are many demands for a mesh generation method for a three-dimensional geometric model, a method is desired for automatically generating a quadrilateral mesh (a hexahedral mesh in the three-dimensional space) that can be expanded to a three-dimensional model.

As mentioned above, there are numerous demands for an automatic generation method for a quadrilateral mesh. And not only an automatic generation method, but also a method that can cope with the following requests is desired.

(1) Less Distortion in a Generated Quadrangle Element

According to an analysis in computation mechanics, an extremely long element or an element having an extremely large (or small) angle adversely affects the result of the analysis. Ideally, therefore, all the quadrangle elements must be as close to being squares as is possible.

(2) Control of an Alignment Direction (arrangement direction) of Generated Quadrilateral Elements According to an analysis in computation mechanics, it is preferable in many cases that elements are aligned in a direction of a physical value, such as stress, or along boundaries of a geometric model. Thus, it is desirable that a mesh is generated in which many elements are regularly arranged in a direction specified by a user.

(3) Control of a Distribution of Sizes of Elements

From the view of reduction in calculations, it is preferable that smaller mesh elements are generated in an important portion, and larger mesh elements are generated in a less important portion. However, when the size of the mesh element is suddenly changed, a T structure (a state where a node point of an adjacent element is placed on a chord of an element) is generated and adversely affects the analysis. It is, therefore, important that mesh elements in different sizes are distributed while it is ensured that the elements are connected by using shared node points and shared segments.

(4) Capability Handling Complicated Curved Shape as an Object

In models designed by CAD, there are various curved shapes, such as a trimmed curved shape obtained by removing one part of a curved region, or a very winding curved shape. It is desired that a quadrilateral mesh is automatically generated even for such a curved shape.

(5) Expansion into a Three-dimensional Geometric Model

An analysis employing the current computer mechanics develops a three-dimensional model from a two-dimensional geometric model in accordance with the enhancement of a calculation capacity. However, very few quadrilateral meshes (hexahedral meshes) are employed for a three-dimensional model. A meshing method is desired for employing the same operational principle to expand from a two-dimensional model to a three-dimensional model.

According to the above described bubble mesh method, bubbles are generated in a region of a geometric model and are moved to stable locations, and their center points are connected to generate a triangle mesh. Ordinarily, the following methods are employed to generate a quadrilateral mesh from such a triangle mesh.

(1) Method for Connecting two Adjacent Triangles to Form a Single Quadrangle.

The pairing of triangles is difficult, and when there is an odd number of triangles, an extra triangle remains. In addition, a quadrangle formed from two triangles is normally a parallelogram, and is neither a square nor a rectangle, both of which are appropriate shapes for a mesh.

(2) Method for Dividing a Triangle into Three Quadrangles.

With this method, it is difficult to generate an anisotropic quadrangle.

Either method is inadequate for the generation of a quadrangle performed while taking direction into account, and currently, this problem is resolved by applying a topologically heuristic rule. In addition, the above methods for changing a triangle mesh into a quadrilateral mesh are not practical, although theoretically with these methods the two-dimensional model could be expanded to the three-dimensional model.

Conventional methods for generating a quadrilateral mesh are as follows.

(1) Method for Employing Division of a Region by a User.

This method is a so-called "mapped mesh" method. A geometric model is divided into triangles or quadrangles in advance by a manual operation, such as the manipulation of a mouse, and the divided regions are further divided into lattices (see "Finite Element Mesh Generation Method: A Review And Classification," Ho-Le K., Computer Aided Designing, Vol. 20, No. 1, 1988, pp. 27–38). Since manual division of the regions is involved, this method does not satisfy the requirement for automatic generation. An enormous amount of manual labor would be required to generate a mesh for all the parts of a single car. In addition, since the results of the division, which is a pre-process, vary from user to user, the generated meshes differ, depending on the user.

(2) Method for Sequentially Generating Quadrilateral Elements from Boundaries of a Region.

This method is a so-called "advancing front mesh" generation method (see "A New Approach To Automated Quadrilateral Mesh Generation," Blacker T. D., Paving, International Journal For Numerical Methods In Engineering, Vol. 32, pp. 811–847, 1991). According to this method, a row of quadrilateral elements is generated along a boundary of the region and another row of quadrilateral elements is generated on the previous row in the region, and this process is repeated until the region is filled with quadrilateral elements. With this method, since the elements inside the region tend to be distorted, the above requirement (1) can not be satisfied. In addition, since the direction in which the elements are arranged is limited to a direction along the boundaries of the region, the above requirement (2) is not fully satisfied.

SUMMARY OF THE INVENTION

It is, therefore, one object of the present invention to provide a method for automatically generating a quadrilateral mesh.

It is another object of the present invention to provide a method for generating a less distorted quadrilateral mesh.

It is an additional object of the present invention to provide a method whereby a direction can be designated in which generated quadrilateral mesh elements are arranged.

It is a further object of the present invention to provide a hexahedral mesh generation method whereby a method employed for the two-dimensional space can also be employed for the three-dimensional space.

It is yet another object of the present invention to provide a quadrilateral mesh generation method that can be applied for a geometric model having a complicated shape.

It is yet an additional object of the present invention to provide a quadrilateral mesh generation method whereby the sizes of generated mesh elements can be controlled.

The present invention is a modification of the previously described bubble mesh generation method. In this invention, two or more types of bubbles are employed to generate a mesh, whereas conventionally only one type of bubble is employed. Two bubble types are adequate for the generation of a quadrilateral mesh. When stable locations for the two or more types of bubbles are calculated and only the center points of bubbles of a specific type are connected, a quadrilateral mesh can be generated. When two or more types of spherical bubbles are used to fill a geometric model in the three-dimensional space, and when the stable locations of the bubbles are also calculated and only the center points of bubbles of a specific type are connected, a hexahedral mesh can be generated.

Since, in the conventional bubble mesh, one type of bubbles are arranged using a force corresponding to an intermolecular force, triangles (tetrahedrons in the three-dimensional space) are generated when the centers of the bubbles are connected. This invention employs a plurality of types of bubbles, which are assumed as crystals, such as salt crystals, produced by ionic bonds of a plurality of atoms. When multiple types of bubbles are employed and the centers of bubbles of a specific type are connected, a quadrilateral mesh (a hexahedral mesh in the three-dimensional space) can be generated directly. The method of the present invention can be applied for three-dimensions.

The present invention is summarized as follows. First, a geometric model, which is an object of meshing, is input. The model is either two-dimensional or three-dimensional. Multiple bubbles of a plurality of types are generated in a region of the geometric model. The bubbles are moved according to an interbubble force defined by a predetermined rule, and the bubble count is controlled to adjust a neighboring relationship between the bubbles, so that the stable allocation of the bubbles are determined. The centers of bubbles of a specific type, from among the plurality of types, are connected and a mesh is generated. With this method, a quadrilateral mesh or a hexahedral mesh can be automatically generated.

When an interval between bubbles exceeds a predetermined interbubble distance, the interbubble force defined by the predetermined rule serves as a reaction force between bubbles of the same type, and as an attraction force between bubbles of different types. In addition, within the predetermined interbubble distance, the interbubble force can serve as a reaction force. As a result, when a potential is checked from a specific bubble over a bubble of a different type, a potential of the specific bubble is canceled, so that only the force between adjacent bubbles need to be calculated and calculation processing can be performed rapidly. When the order of the force differs between a case where the interval between bubbles exceeds the predetermined distance and a case where the interval is within the predetermined distance (e.g., in the latter case, the force is of a higher order), regions that are governed by the respective forces can be specified and the force that does not affect these regions can be disregarded. As a result, the processing is simplified.

In a process for determining stable locations of the bubbles, when the bubble count is adjusted so as to control the neighboring relationship between the bubbles, if bubbles of the same type are adjacent, a bubble of a different type may be added to a region enclosed by the bubbles of the same type, or one of the adjacent bubbles of the same type can be changed to another type. In addition, when the number of the bubbles of the specific type exceeds a predetermined count around one bubble of a different type, a bubble of the different type can be added in the vicinity of the one bubble. As a result, a mesh of a desired shape having less distortion can be obtained. For bubble count control, whether bubbles are packed closely or loosely is taken into account.

The process for inputting an alignment direction of a generated mesh and for determining the stable allocation of the bubbles may include: a step of, by using the alignment direction of the generated mesh and an element shape of the mesh, calculating a direction in which a bubble of the specific type and a bubble of a different type are adjacent; and a step of generating an interbubble force in the direction. Therefore, mesh elements can be arranged in a direction desired by a user, and the processing can be performed quickly. It should be noted that the user does not have to designate the direction. The alignment direction can be automatically designated by employing a method for automatically detecting a direction along a boundary of the geometric model to be meshed.

As previously described, a quadrilateral mesh and a hexahedral mesh can be acquired by performing a process comprising the steps of: generating a plurality of bubbles of a first and a second type in a region of a geometric model, which is an object of meshing; determining the stable allocation of the bubbles by moving the bubbles according to an interbubble force defined by a predetermined rule, and by adjusting the number of the bubbles of the first type, which are adjacent to one bubble of the second type, to four; and generating the mesh by connecting the centers of bubbles of either type.

The processing of the present invention has been explained; however, the present invention can be realized by implementing an apparatus for performing the above process, or by using a program that causes a computer to perform the above process. It would be obvious to one having ordinary skill in the art that such a program could be stored on a storage medium, such as a floppy disk or CD-ROM, or in another type of storage device.

DESCRIPTION OF THE PREFERRED EMBODIMENT

Figure 1:
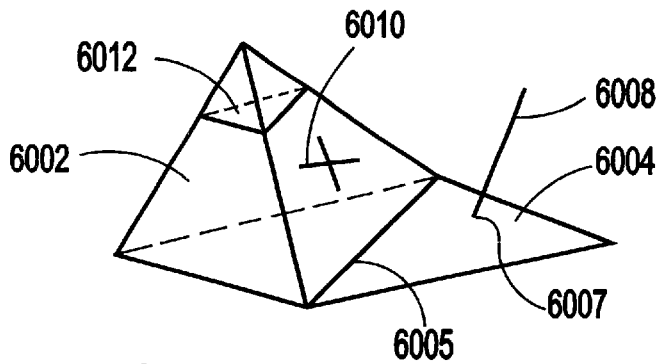
FIG. 1 is a diagram for explaining an input geometric model.

In the preferred embodiment, an example for a meshing of a non-manifold data structure will be explained. FIG. 1 shows a geometric model represented by a non-manifold data structure. In the model in FIG. 1, a triangle 6004, which is a two-dimensional object, contacts with a tetrahedron 6002, which is a three-dimensional object, at an edge line 6005 functioning as a boundary. A linear line 6008, a one-dimensional object, contacts with the triangle 6004 at a shared point 6007. A one-dimensional object like " " is attached to one side of the object 6002. In addition, the object 6002 includes a boundary 6012 along which the object 6002 is divided.

Figure 2:
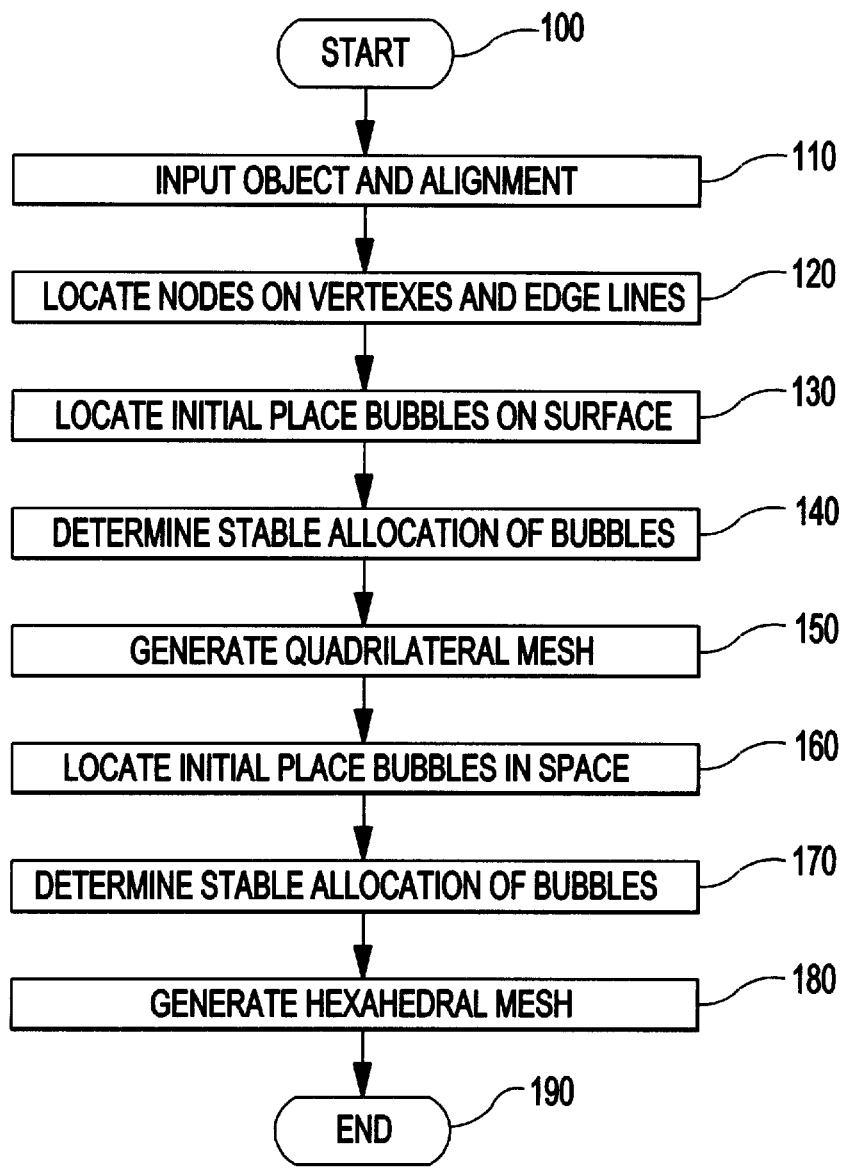
FIG. 2 is a flowchart for the processing of the present invention.
Figure 3:
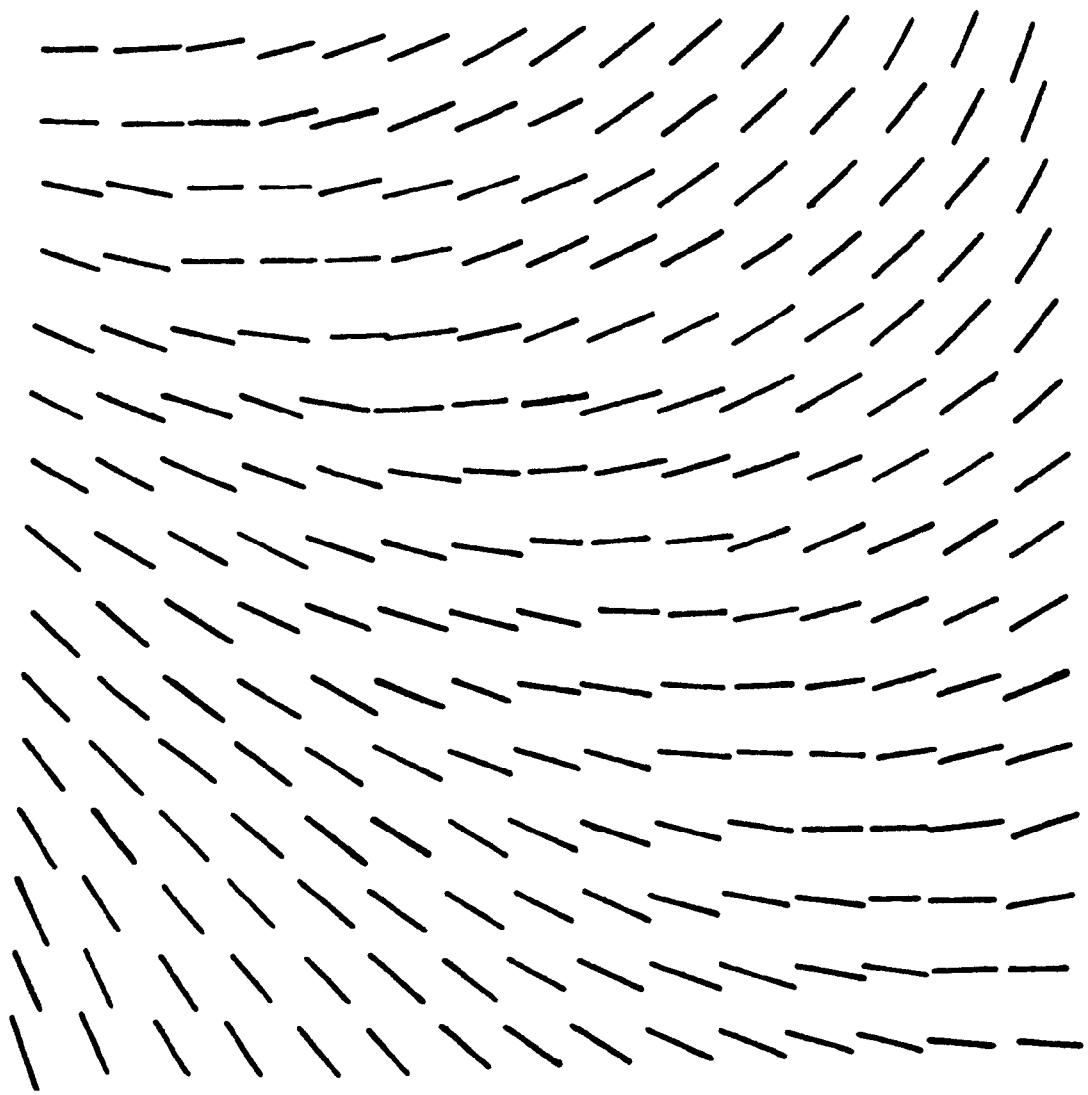
FIG. 3 is a diagram for explaining an example alignment direction.

The processing for meshing the object in FIG. 1 is shown in FIG. 2. First, an object to be meshed and an alignment direction of the mesh are input (step 110). The object to be meshed is an object such as shown in FIG. 1. The alignment direction of the mesh represents the direction in which mesh elements in the input object are arranged, and is provided as a vector. When a plane is to be meshed, for example, a direction in which mesh elements are aligned (the direction of lines drawn in FIG. 3) is input, as shown in FIG. 3. The direction need not be input in such detail as shown in FIG. 3, and may not be input. The alignment direction can be automatically generated.

Figure 4A:
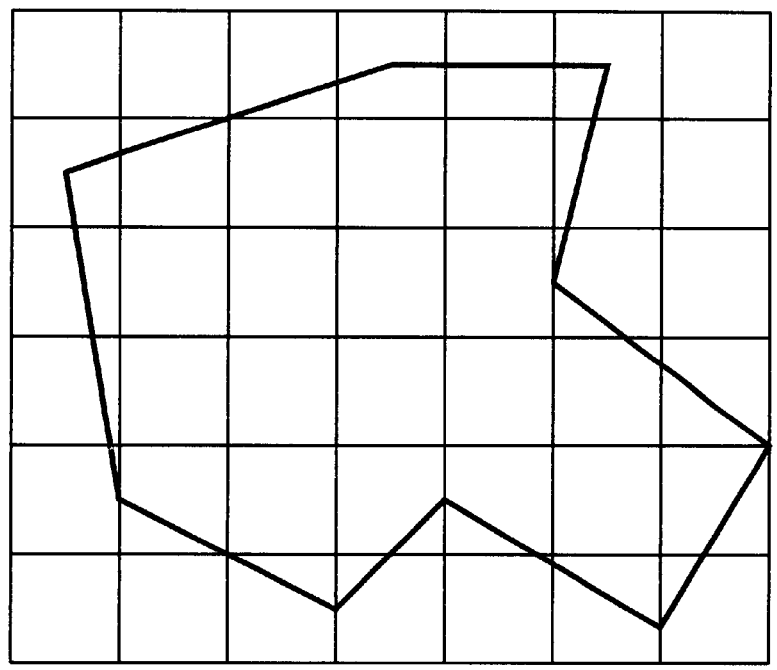
FIGS. 4 are a diagram for explaining automatic generation for the alignment direction.
Figure 4B:
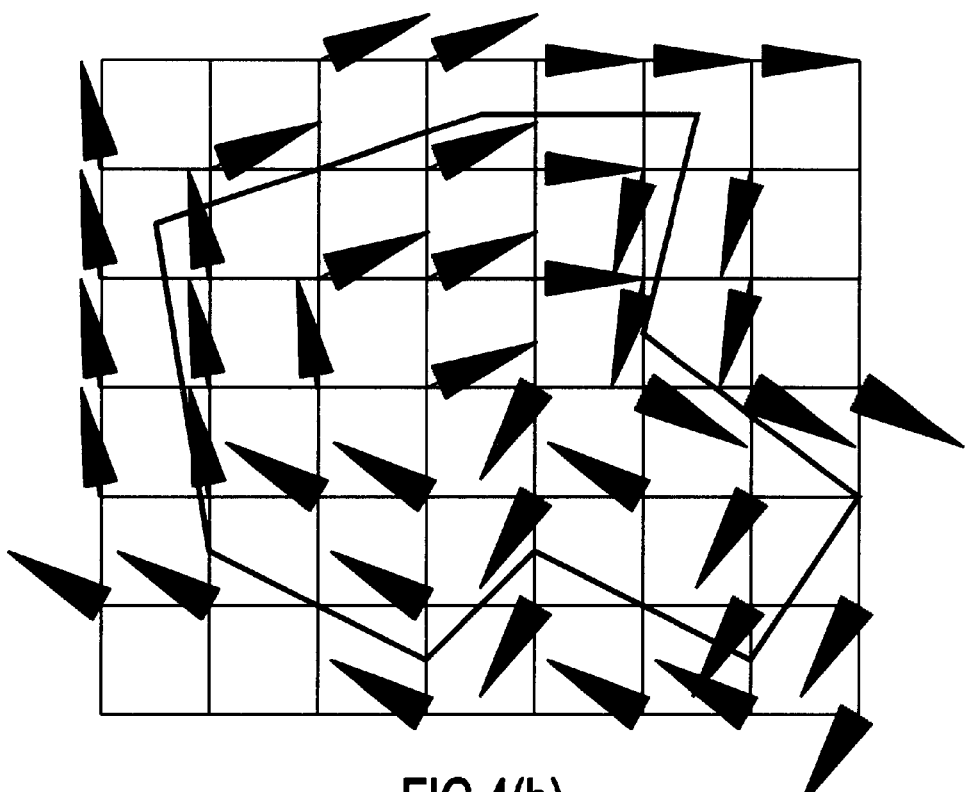

For automatic generation of a direction, as shown in FIG. 4(*a*), an orthogonal lattice covering the region of a geometric model is assumed. A closest boundary line is selected for each node point of the lattice, and a vector direction of the closest boundary line is provided for each node point of the lattice. Then, vectors are provided for the individual points, as shown in FIG. 4(*b*). The alignment direction of each bubble is determined by linearly interpolating the vectors provided for four points that enclose the bubble.

Following this, mesh nodes are located on vertexes and edge lines of the input object (step 120). The process for the vertexes and edge lines is the same as the conventional bubble mesh generation method. Another method can be used for the performance of this process because two types of bubbles need not be employed for the vertexes and edge lines. According to the method described in Japanese Unexamined Patent Publication No. Hei 7-230487, for example, (1) a bubble is placed at a vertex, (2) bubbles are placed on an edge line, (3) the bubbles are moved by an interbubble force defined by a predetermined rule and the bubble count is controlled by examining the packing condition of the bubbles, so that the stable allocation of the bubbles can be determined, and (3) the centers of the bubbles are regarded as mesh nodes. The processing for the vertexes and edge lines is thereafter completed.

Figure 5:
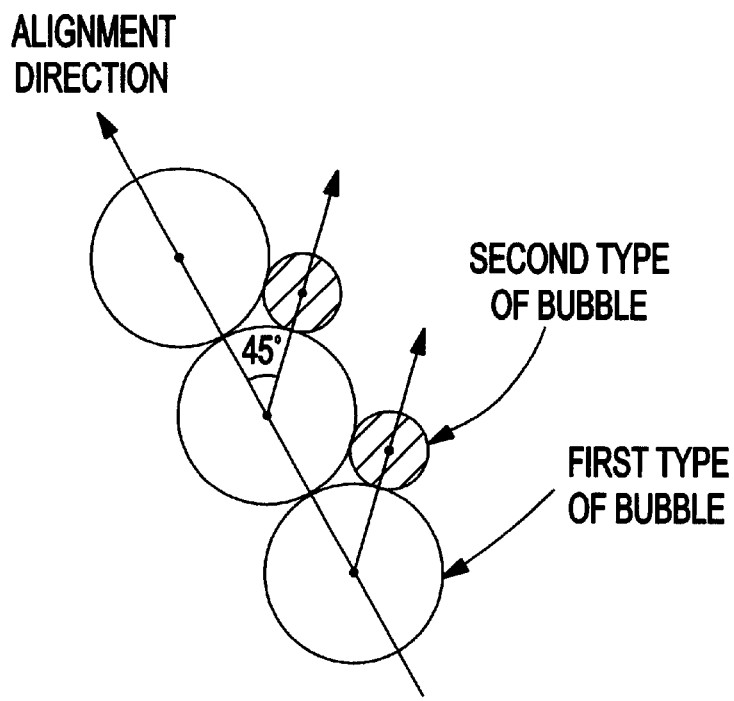
FIG. 5 is a diagram for explaining the initial arrangement.

The bubbles are initially placed on the surface of the input object (step 130). At this time, two types of bubbles are employed. Bubbles of a first type are regarded as those for forming a mesh by connecting the centers of the bubbles. Bubbles of a second type are bubbles other than those of the first type. Because of the initial location, the bubbles need only be packed within the surface (including a plain surface and a curved surface). However, since the mesh nodes on the vertexes and edge lines are acquired at step 120, the bubbles of the first types are placed on the mesh nodes on the vertexes and edge lines. In addition, since the mesh nodes on the vertexes and edge lines need not be changed in the following process, the bubbles on the mesh nodes on the vertexes and edge lines are fixed. If the bubbles of the first type are arranged in the designated alignment direction, and the bubbles of the second type are arranged in a direction at an angle of 45 degrees relative to the alignment direction (see FIG. 5), the period of time required for determining the stable allocation can be reduced in the following process. The sizes of the mesh elements can be controlled by changing the diameters of the bubbles.

As described above, the surfaces include plane surfaces and curved surfaces. While no particular problem happens in processing of plane surfaces, for the initial arrangement for the curved surfaces, a method may be employed whereby bubbles are arranged in a parameter space corresponding to the curved surface, and this arrangement is mapped on the curved surface.

The stable allocation of the bubbles are determined (step 140).

This process will now be explained in more detail.

TABLE 1

```
10: for (the process is repeated until the furthest distance
    that the bubble is moved is equal to or less than a threshold
    value){
20:   trianguiar division
30:   /* calculation of force and bubble movement */
40:   for (relative to each bubble){
50:     •calculate sum of forces exerted by adjacent bubbles
60:     •move bubbles in accordance with the sum of forces
70:   }
80:   /* adding and deleting bubbles */
90:   for (each side of each triangle){
100:    if (a side is much longer than the sum of the radii of
        bubbles){
110:        •add a new bubble at the midpoint of the side
120:    }
130:    if (a side is much shorter than the sum of the radii of
        bubbles){
140:        •delete a bubble at either end of the side
145:    }
147: }
150: for (each bubble){
160:    if (a neighboring relationship is satisfactory?){
170:        •add a bubble or change a bubble type
175:    }
180: }
190: }
```

An explanation will now be given referring to the above described pseudo code. The process from the line 10 to the line 109 is repeated until the furthest distance that the bubble is moved is equal to or less than a threshold value. The threshold value may be an average of the distances in which all the bubbles are moved, and the iterations are performed until the bubbles are not moved very much further. The number of iterations can be controlled by changing the threshold value. When a large value is set, the furthest distance will be less than the threshold value, and the processing will be completed before the bubbles are stabilized.

The process from the line 10 to 190 is roughly divided into three portions. The first portion is the triangular division at the line 20; the second portion covers from the line 30 to 70, for calculating the interbubble force and the movement of bubbles; and the third portion extends from the line 80 to 180, for controlling the bubble count.

The line 20, which is the first portion, is the triangular division process for acquiring the neighboring relationship between bubbles, i.e., for determining how the centers of the bubbles should be connected. The Delaunay triangular division procedure may be employed as the triangular division method. Since triangular division is performed to get how the bubbles are connected, if the neighboring relationship can be understood without performing triangular division, this process is not necessary.

The line 30 to 70, which constitute the second portion, is further divided into two segments, at the line 50 and the line 60. At the line 50, the sum of forces exerted from the adjacent bubbles is calculated. In this embodiment, the bubbles are circles, which are virtual objects having mass m. All of the bubbles may have the same mass or may have different masses, depending on their sizes. In this embodiment, the force acting between the objects is defined as follows.

(1) Low-order Attraction Force fe

When bubble types differ, the force acting between the bubbles is defined as an attraction force, and when the bubble types are the same, it is defined as a reaction force. This corresponds to an electrostatic power in a natural field. This force is defined by, for example, the following equation.

$$f_e\left(\frac{d}{r_a+r_b}\right) = \frac{\varepsilon \cdot e_a \cdot e_b}{\left(\frac{d}{r_a+r_b}\right)^2 \cdot (r_a+r_b)^2} \quad \text{[Expression 1]}$$

wherein $\varepsilon$ denotes a constant; $e_a$ and $e_b$, coefficients for indicating a bubble type, the first bubble type being 1 and the second bubble type being −1; d, an interval between two bubbles; and $r_a$ and $r_b$, the radii of bubbles.

(2) High-order Repulsive Force fr

This repulsive force reacts against the multiplier of the interval between bubbles. The multiplier is greater than the order of fe. If the repulsive force corresponds to Van der Waals force in a natural field, it is represented as follows.

$$f_r\left(\frac{d}{r_a+r_b}\right) = 12\frac{x}{\left(\frac{d}{r_a+r_b}\right)^{13}} - 7\frac{y}{\left(\frac{d}{r_a+r_b}\right)^7} \quad \text{[Expression 2]}$$

wherein x and y are constants.

The forces fe and fr are reduced as the distance increases; however, a reduction in the fr that is the higher order function is faster, so that only the force fe need be taken into consideration for a long distance. In the stable condition, an assumption for fe that "the potential field outside adjacent bubbles is uniform" is determined to be true. Only the force between adjacent bubbles need be calculated if this assumption is determined to be true, and bubbles for which interaction should be considered can be specified. The condition that the two functions satisfy is $|fe(1)|=|fr(1)|$.

The attraction force and the repulsive force are calculated for all the bubbles that are adjacent to a single bubble. As described above, whether or not a bubble is adjacent to a certain bubble is determined by examining the connection of the sides of a mesh element generated by the triangular division. When the interbubble force has been calculated for all the bubbles that are adjacent to a specific bubble, the obtained forces are added together. The process at the line 50 is thereafter completed.

Figure 6:
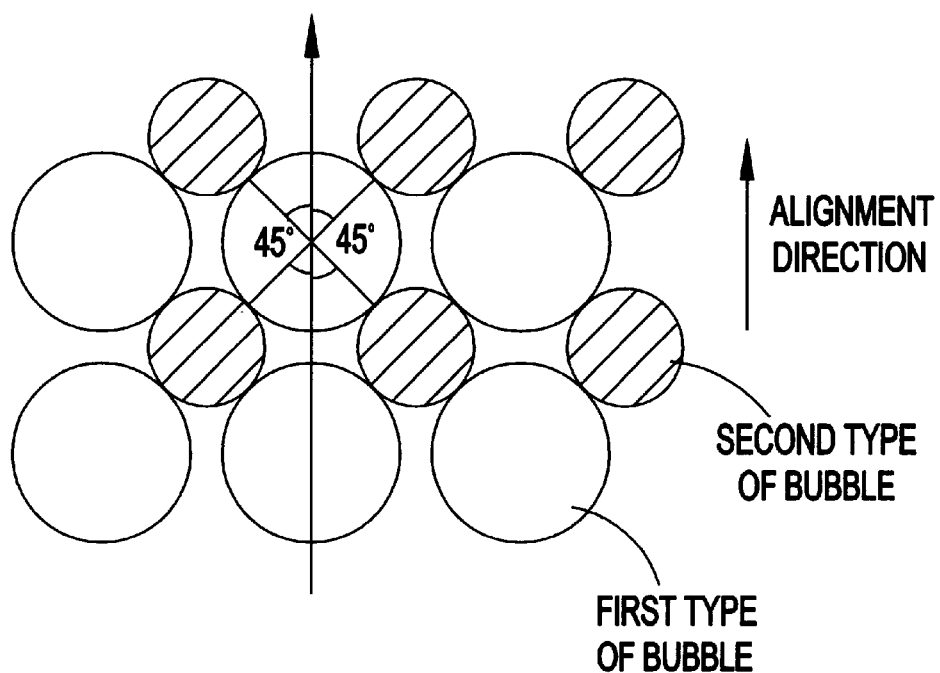
FIG. 6 is a diagram for explaining a desired bubble arrangement.

It should be noted that when only the above process is performed, much time may be required to position the bubbles at stable locations. If the following process is performed, the operation will be completed within a shorter period of time. That is, to generate a quadrilateral mesh, it is preferable that four bubbles of the first type are disposed around one of the bubbles of the second type, and that an angle formed by the alignment directions of the first bubble type and the second bubble type is 45 degrees, as shown in FIG. 6. When the interbubble force is adjusted so that a bubble of the second type and a bubble of the first type are adjacent to each other in this direction, the processing speed is increased.

Figure 7:
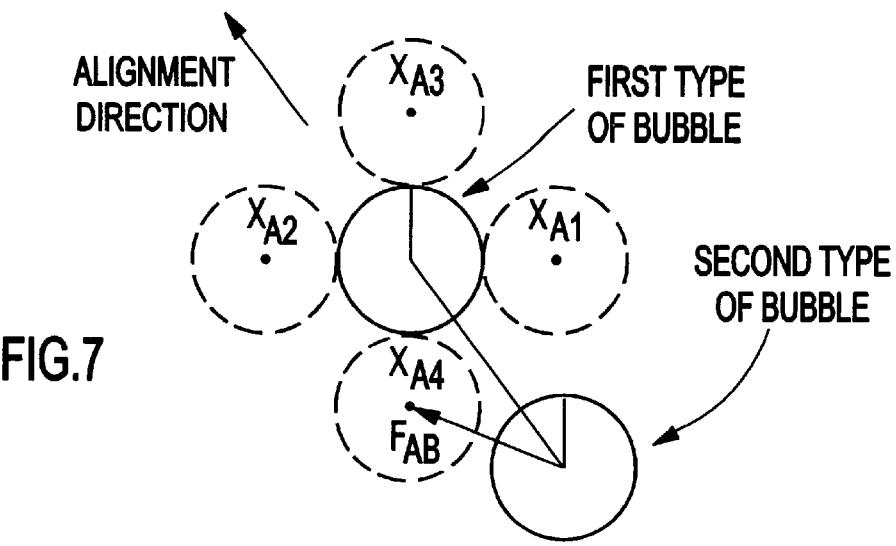
FIG. 7 is a diagram for explaining a virtual bubble.
Figure 8:
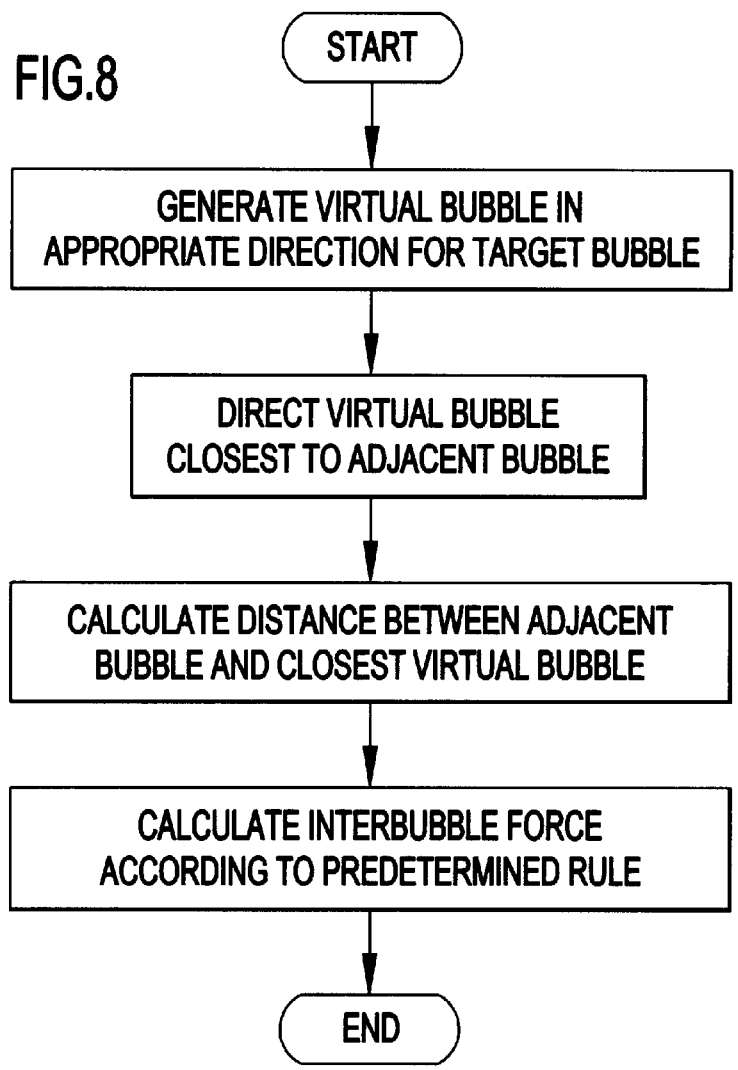
FIG. 8 is a flowchart showing a process for a virtual bubble.

Assume that a virtual bubble has been provided in the direction of a vector offset by an angle of 45 degrees from the alignment direction of a bubble of the first type, and that the force between the virtual bubble and another bubble has been calculated. Suppose further that the virtual bubble is a replacement for the original bubble and has the same property. FIG. 7 shows an example where four virtual bubbles are arranged around a bubble of the first type. Virtual bubbles A1, A2, A3 and A4, which have centers $x_{A1}$, $x_{A2}$, $x_{A3}$ and $x_{A4}$, are arranged so as to have an angle of 45 degrees relative to the alignment direction. In the example in FIG. 7, the interbubble force is calculated for a bubble of the second type and the virtual bubble A4 that is the closest to it. Although virtual bubbles are located around a bubble of the first type in this case, the same process is performed in a case where the virtual bubbles are located around a bubble of the second type. The flowchart of the processing is shown in FIG. 8. This process is employed to perform calculations for all the bubbles that are adjacent to a target bubble, and all of the interbubble forces obtained relative to the target bubble are added together.

The process performed at the line 60 is one for actually moving bubbles. In this process, how far a bubble is to be moved need be calculated. The individual bubbles are regarded as points having a mass m (having no moment of inertia) and calculation of the second-order ordinary differential equation is performed, while taking the interbubble force and viscosity into account, so that the positions of the bubbles are changed. Newton's equation is as follows.

$$m_i\frac{d^2x_i(t)}{dt^2} + C_{xi}\frac{dx_i(t)}{dt} = f_{xi}(t) \quad \text{[Expression 3]}$$

$$m_i\frac{d^2y_i(t)}{dt^2} + C_{yi}\frac{dy_i(t)}{dt} = f_{yi}(t)$$

$$m_i\frac{d^2z_i(t)}{dt^2} + C_{zi}\frac{dz_i(t)}{dt} = f_{zi}(t)$$

wherein $x_i$ denotes the coordinate x (the coordinate x in the parameter space) of the i-th bubble; mi, the mass of the i-th bubble; $y_i$, the coordinate y of the i-th bubble (the coordinate y in the parameter space); and zi, the coordinate z of the i-th bubble (the coordinate z in a parameter space). The term of the first-order differential includes viscosity coefficient $c_i$, and takes the viscosity into account. Different values for the viscosity coefficients can be set for individual bubbles and in the x, the y and the z directions, or a constant value c can be set. The terms $f_{xi}(t)$, $f_{yi}(t)$ and $f_{zi}(t)$ on the right side of Expression 3 are respectively the sum of x elements, the sum of y elements and the sum of z elements of the forces that are exerted by the adjacent bubbles relative to the i-th bubble at time t.

A well known numerical analysis technique for the ordinary differential equation, such as Runge-Kutta analysis, is employed to increase time t in Expression 3 by Δt and to calculate coordinate values of individual bubbles. As described above, since the iteration of the line 10 to 180 in the pseudo code is determined by whether the movement distance is equal to or less than the threshold value, the movement distance (Δx, Δy, Δz) is also calculated. Since the original coordinate values are obtained in advance, only the movement distance (Δx, Δy, Δz) may be calculated. The numerical analysis technique for the ordinary differential equation is not limited to the Runge-Kutta method, and the Adams method or the Euler method may be employed. See, for example, "Numerical Calculation," Haruo Jonouchi, Mathematics For Engineering 15, Science Co., September, 1978.

The process for the line 40 and 50 in the pseudo code is performed for all the bubbles. Up to this process, coordinates (and/or movement distance (Δx, Δy, Δz)) for the individual bubbles after a minute time Δt has elapsed can be obtained.

It should be noted that some bubbles are located outside the surface after they are moved. A process for returning these bubbles to locations inside the surface is performed. A method for returning the bubbles to the surface along the normal to the surface, or another method may be employed.

An explanation will be given for the process employed from the line 80 to 180, which is the third portion, to add or to delete a bubble. The line 90 describes the iteration of the following process for each side of a triangle. This triangle is part of a mesh that was generated by triangular division performed at the line 20 in the pseudo code. Since the bubbles moved after the process at the line 20 was performed, triangular division may again be performed before the process at the line 80 begins. The additional performance of triangular division is arbitrary. At the line 100, it is checked whether or not the ratio of the side of a triangle to the sum of the radii of two bubbles that intersect the side of the triangle is equal to or less than a first threshold value. That is, it is checked whether there is a too large gap between the bubbles. When the ratio is equal to or less than the first threshold value, one bubble is generated at the midpoint of the side of the triangle (line 110).

When the ratio is equal to or greater than a second threshold value (line 130), this means that the bubbles are packed too tightly and a bubble at either end of the side of the triangle is deleted (line 140). No process is performed for a side that does not satisfy either condition. As a result, an appropriate bubble count is adaptively maintained.

Although the control of the bubble count based on the side of the triangle has been explained, the present invention is not limited to this. For example, a method can be employed for determining the degree of overlapping, which is described in Japanese Unexamined Patent Publication No. Hei 8-315183 in the Background Art. It is preferable to perform the triangular division again for the following process.

Figure 9A:
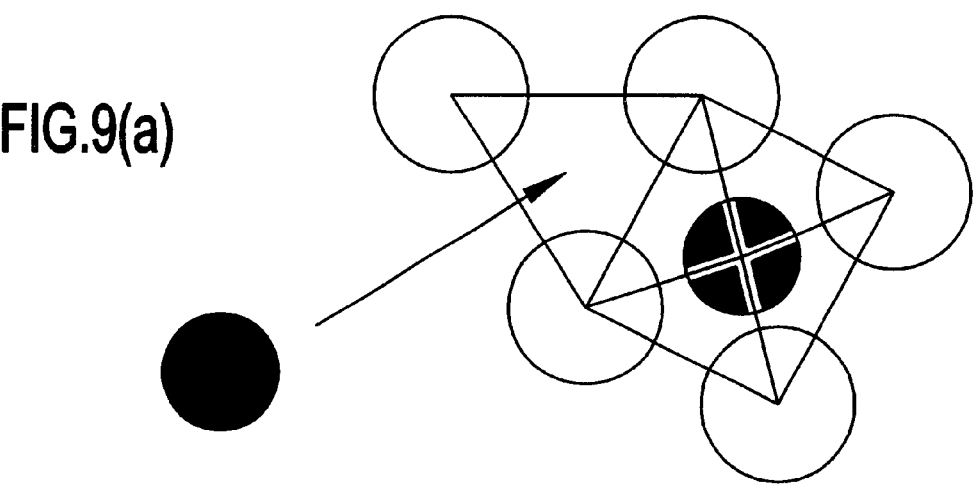
FIGS. 9 are a diagram for explaining a process for adjusting a neighboring relationship of bubbles.
Figure 9B:
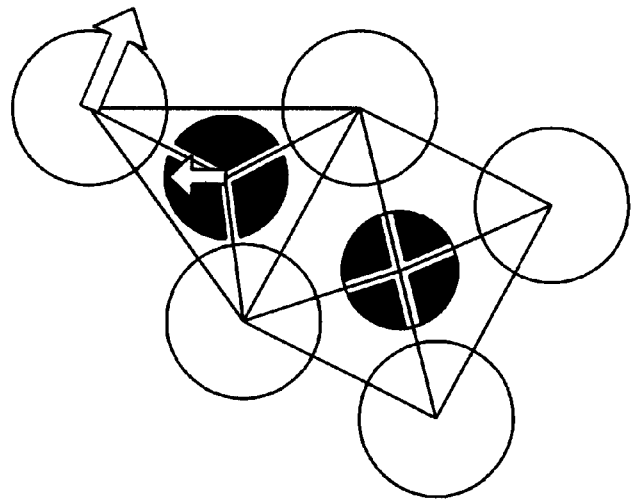
Figure 9C:
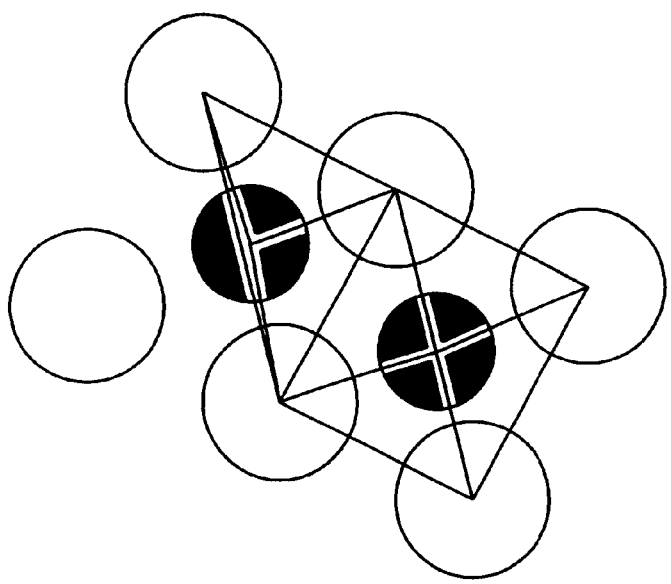

Further, in this invention, to generate a quadrilateral mesh, the adjustment of the neighboring relationship between bubbles is also performed in the process for adding or deleting a bubble. When bubbles of the same type are located at the vertexes of a triangle, a bubble of the different type is added inside the triangle. When white bubbles are located at all the vertexes of the triangle, as shown in FIG. 9(a), a black bubble is added inside the triangle. As a result, the bubbles are too close to each other, as shown in FIG. 9(b), and the force is exerted in directions indicated by arrows in FIG. 9(b). Thus, by the successive iteration of the process by the line 10, the bubbles will move in the directions indicated by the arrows, and will be arranged as shown in FIG. 9(c).

The operation in FIG. 9 is effective when the number of iterations performed by the line 10 is relatively small. When a local stable condition is forcibly provided for bubbles that are far from the stable allocation, a more desirable mesh can be generated.

Figure 10A:
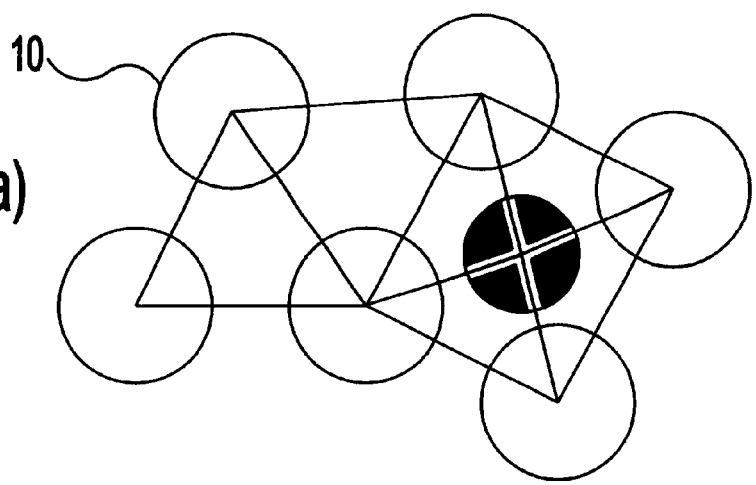
FIGS. 10 are a diagram for explaining the process for adjusting the neighboring relationship of bubbles.
Figure 10B:
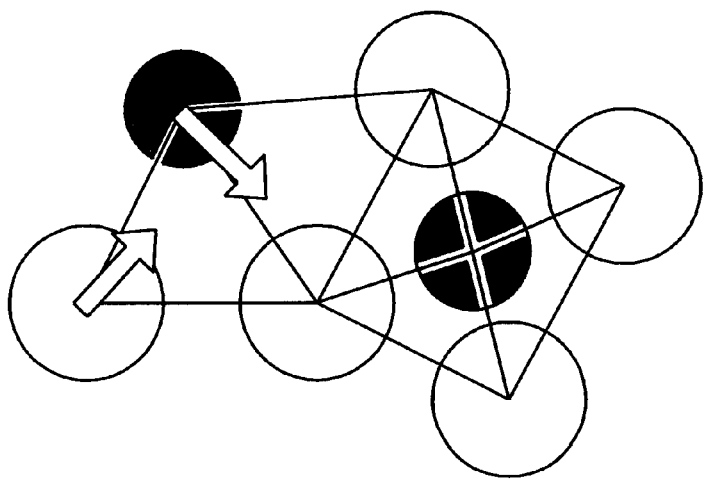
Figure 10C:
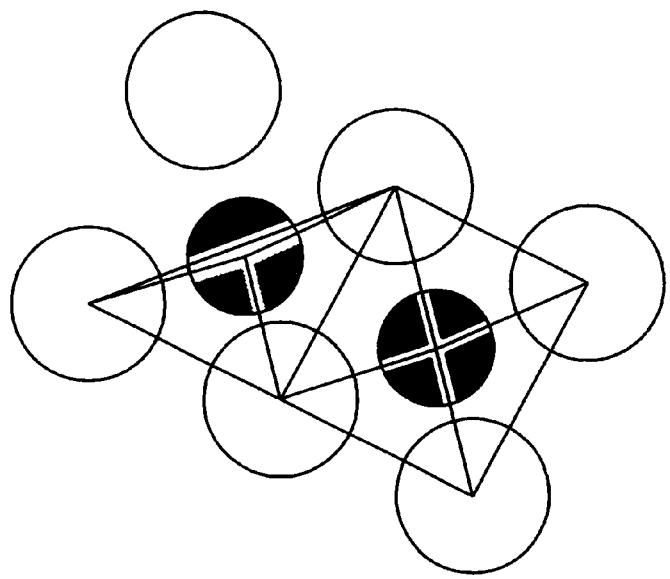

Instead of performing the above described operation, the change of a bubble type is also an effective means. When a bubble 10 in FIG. 10(a) is changed to a black bubble, the state in FIG. 10(b) is provided. Since force is exerted in directions indicated by arrows in FIG. 10(b), the successive iteration of the process by the line 10 is performed to acquire the bubble arrangement shown in FIG. 10(c). This process is effective in a case where a mesh is generated in a small area or a case wherein the locations of bubbles can not be changed much because the allocations converge to a degree.

Figure 11A:
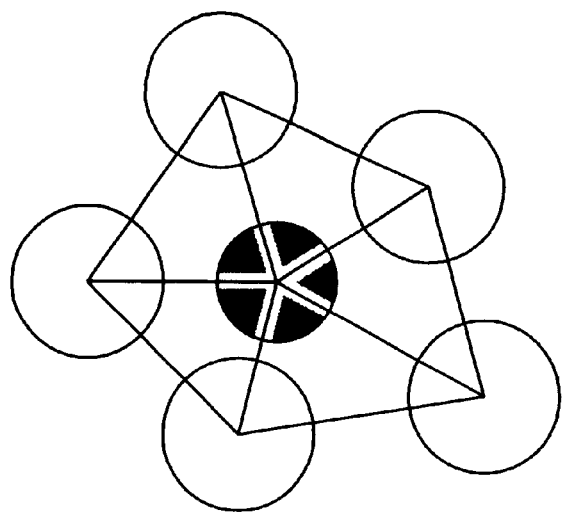
FIGS. 11 are a diagram for explaining the process for adjusting the neighboring relationship of bubbles.
Figure 11B:
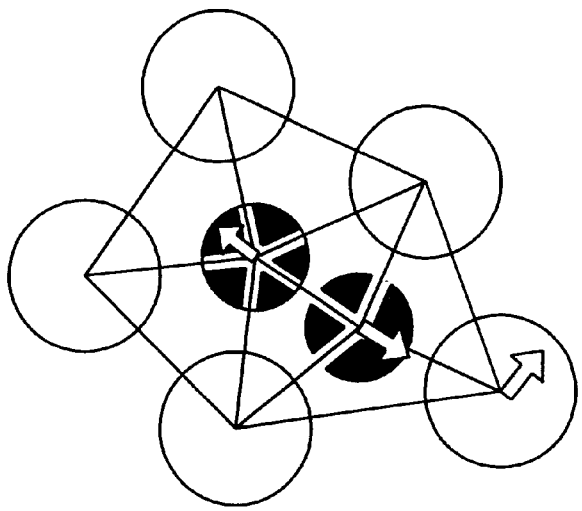
Figure 11C:
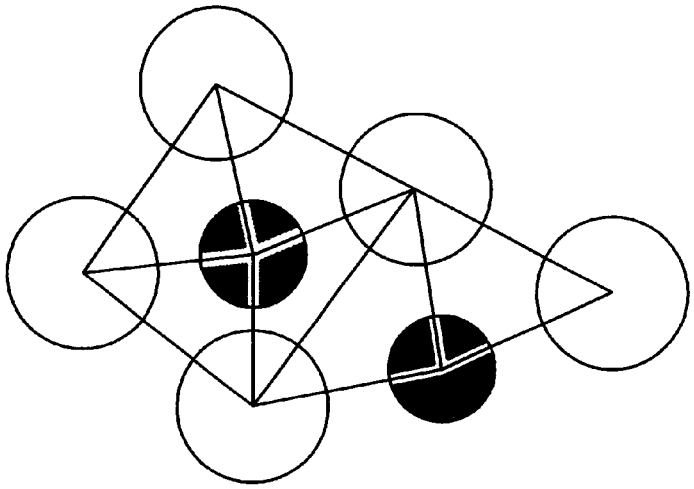

When the number of bubbles of the first type, which are adjacent to the second bubble, exceeds four, the bubble of the second type is divided into two (or another bubble is added) and the number of bubbles of the first type bubbles adjacent to one bubble of the second type is reduced to four or less. As shown in FIG. 11(a), when a bubble of the second type is located at the vertexes of four or more triangles, another type of bubble is added, as shown in FIG. 11(b). Then, the force is exerted in the directions indicated by arrows in FIG. 11(b), and by the successive iteration of the process by the line 10, the locations of the bubbles can be changed, as shown in FIG. 11(c). The same process can be performed for a bubble of the first type, instead of the second type.

When the process returns to the line 10, it is checked whether or not the furthest bubble movement distance that occurred at the line 50 exceeds a threshold value. $(\Delta x^2+\Delta y^2+\Delta z^2)^{0.5}$ may be employed for the movement distance, or simply $|\Delta x|+|\Delta y|+|\Delta z|$ may be employed. When the greatest movement distance exceeds the threshold value, the process from the line 10 to 180 is performed. When the greatest distance does not exceed the threshold value, it is assumed that the bubbles are stably located and the succeeding process is performed.

Figure 12:
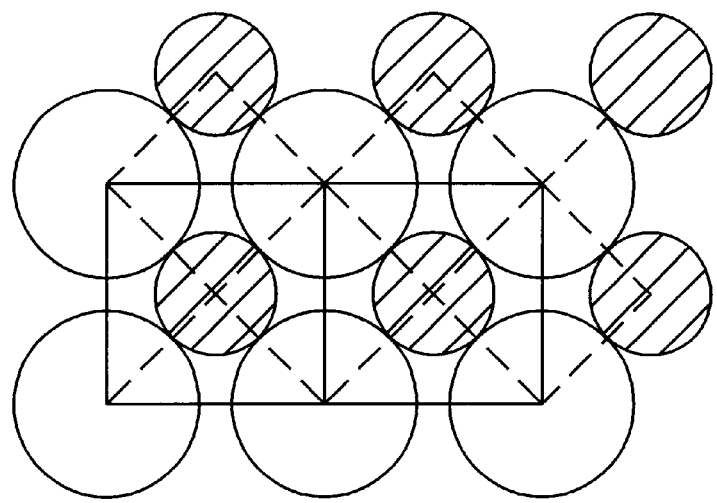
FIG. 12 is a diagram for explaining a quadrilateral mesh.

The above described process is the one performed at step 140 in FIG. 2. Following this, a quadrilateral mesh is generated (step 150). In this process, first, the neighboring relationship of the bubbles is apparent as the result of triangular division, and a quadrilateral mesh can be generated by lines that connect the bubbles of the first type. As shown in FIG. 12, a mesh is formed by solid lines that connect the white bubbles of the first type.

The meshing for a surface is thereafter completed.

Next, hexahedral bubbles are generated in the three-dimensional space. First, bubbles are initially located in the space (step 160 in FIG. 2). Since the stable allocation of the bubbles are obtained in the previous process for vertexes, edge lines and surfaces, they are employed for the vertexes, edge lines and surfaces, and bubbles are arranged, for example, only inside the object 6002 in FIG. 1. It is better at this time for spherical bubbles of the first type to be located in the alignment direction and for bubbles of the second type to be arranged to form a predetermined angle relative to the bubbles of the first type. It should be noted that, as described in the process for the surfaces, since the bubbles will move to proper positions later, a special process may not be performed for the initial arrangement.

Then, the stable allocation of the bubbles are calculated (step 170). This calculation is substantially the same as that performed during the process for the surfaces. However, (1) assuming that a calculation object bubble is the center of the tetrahedron, the direction in which a virtual bubble is generated is the direction of each vertex of a tetrahedron model. The number of virtual bubbles is eight. (2) The number of bubbles should be increased or reduced in order to adjust the neighboring relationship of the bubbles, so that eight bubbles of a specific type enclose a bubble of another type. Instead of being added inside the triangle, a bubble of the different type is added inside the quadrangle. While the process for the surface is performed when bubbles of the same type are located at the vertexes of the triangle, the process for the space is performed when bubbles of the same type are located at the vertexes of the quadrangle. When two or more bubbles of the second type are present at each vertex of the quadrangle, the bubble type is changed so that the only one bubble of the second type is located at one vertex, or a bubble of the first type is added. In other words, the quadrangle is formed with one bubble of the second type and three bubbles of the first type. (3) While the process for returning the bubbles located outside the surface to the inside of the surface has been explained, in this case the bubbles that are outside the space are deleted. Taking such changes into account, the process employed for surfaces can be easily applied to the process for space.

When the quadrangle division is performed, and only line segments that connect the first type bubbles are extracted, a hexahedral mesh can be generated (step 180).

The examples employing two types of bubbles have been explained. For generation of a quadrilateral mesh, two types of bubbles are sufficient; however, in a natural phenomenon, not only two types but also multiple types of atoms are frequently employed to generate a lattice. Therefore, when more types of bubbles are employed, a more complicated mesh can be generated, and a more desirable quadrilateral mesh or hexahedral mesh can be formed. Also a rectangular parallel piped mesh can be acquired by using many types of bubbles. In this case, elements having a plurality of locally stable shapes are closely packed, instead of quad- rilateral elements.

Figure 13:
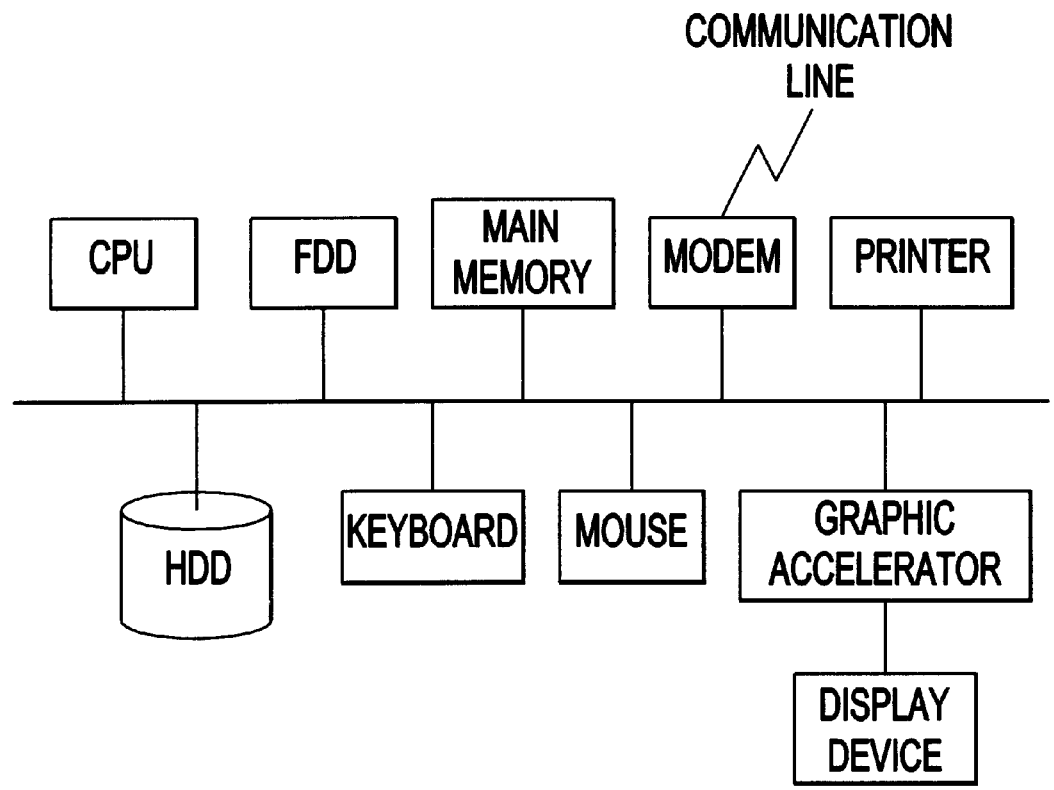
FIG. 13 is a diagram for explaining an ordinary computer system.

The above process can be accomplished by incorporating it in an ordinary computer program, which can be performed by a computer system shown in FIG. 13, for example. The computer program and necessary data are stored on a hard disk drive (HDD), and are loaded into a main memory as needed and executed by a CPU. The data can be entered at a keyboard, or can be read from a floppy disk drive (FDD) or another storage medium, or the computer program can be transmitted by another computer system along a communication line connected to a communication device, such as a modem. Also, the computer program may be supplied by an FD, a CD-ROM, or another storage medium. The results obtained by the present invention is used for numerical analysis by another computer program stored on the HDD, and can be provided for a user by the employment of a display device or a printer.

The present invention can be executed by a dedicated apparatus. For example, modules for executing the individual steps of the process can be prepared, and the final result can be output by exchanging data between the modules. Since in the above embodiment, triangle division is repeated, a module for performing only the triangular division process can be prepared and shared.

According to the present invention, a method can be provided for automatically generating a quadrilateral mesh.

Further, a method can be provided for generating a less distorted quadrilateral mesh.

In addition, a method can be provided whereby a direction can be designated in which generated quadrilateral mesh elements are aligned.

Furthermore, a hexahedral mesh generation method can be provided whereby a method employed for a two-dimensional plane can also be employed for a three-dimensional space.

Also, a quadrilateral mesh generation method can be provided that can be applied to a geometric model having a complicated shape.

Moreover, a quadrilateral mesh generation method can be provided whereby the sizes of generated mesh elements can be controlled.

What is claimed is:

1. A method for generating a mesh, comprising the steps of:

inputting a geometric model, which is an object of meshing;

generating a plurality of bubbles of a first type and a plurality of bubbles of a second type in a region of said geometric model;

determining a stable allocation of said bubbles by moving said bubbles according to an interbubble force defined by a predetermined rule, said interbubble force between a bubble of said first type and a bubble of said second type being different than said interbubble force between two bubbles of said first type, and by controlling the bubble count of said bubbles of said first and second types to adjust a neighboring relationship between said bubbles of said first and second types; and generating the mesh by connecting the centers of bubbles of only said first type.

2. The method according to claim 1, wherein, when an interval between bubbles exceeds a predetermined interbubble distance, said interbubble force serves as a repulsive force between bubbles of a same type, and as an attraction force between bubbles of different types, and wherein, within said predetermined interbubble distance, said interbubble force serves as a repulsive force.

3. The method according to claim 1, wherein said determining step includes a step of, if bubbles of a same type are adjacent, adding a bubble of a different type in a region enclosed by said bubbles of the same type.

4. The method according to claim 1, wherein said determining step includes a step of, if the number of said bubbles of said first type exceeds a predetermined count around one bubble of said second type, adding a bubble of said second type in the vicinity of said one bubble.

5. The method according to claim 1, wherein, said determining step includes a step of, if two bubbles of a same type are adjacent, changing one of the two adjacent bubbles of the same type to another type.

6. The method according to claim 1, further comprising a step of inputting an alignment direction of a generated mesh, and wherein said determining step comprises the steps of:

calculating a direction in which a bubble of said first type and a bubble of said second type are adjacent by using said alignment direction of said generated mesh and an element shape of the mesh; and generating an interbubble force in said direction.

7. A method for generating a mesh comprising the steps of:
   inputting a geometric model, which is an object of meshing;
   generating a plurality of bubbles of a first type and a plurality of bubbles of a second type in a region of said geometric model;
   determining a stable allocation of said bubbles by moving said bubbles according to an interbubble force defined by a predetermined rule, said interbubble force between a bubble of said first type and a bubble of said second type being different than said interbubble force between two bubbles of said first type, and by controlling the bubble count of said bubbles of said first and second types so that the maximum number of said bubbles of said first type, which are adjacent to one bubble of said second type, is four; and
   generating the mesh by connecting the centers of bubbles of only said first type.

8. A computer for generating a mesh, comprising:
   a module for inputting a geometric model, which is an object of meshing;
   a module for generating a plurality of bubbles of a first type and a plurality of bubbles of a second type in a region of said geometric model;
   a module for determining a stable allocation of said bubbles by moving said bubbles according to an interbubble force defined by a predetermined rule, said interbubble force between a bubble of said first type and a bubble of said second type being different than said interbubble force between two bubbles of said first type, and by controlling the bubble count of said bubbles of said first and second types to adjust a neighboring relationship between said bubbles of said first and second types; and
   a module for generating the mesh by connecting the centers of bubbles of only said first type.

9. The computer according to claim 8, wherein said determining module includes means operable in response to the number of said bubbles of said first type exceeding a predetermined count around one bubble of said second type, for adding a bubble of said second type in the vicinity of said one bubble.

10. The computer according to claim 8, further comprising a module for inputting an alignment direction of a generated mesh, and wherein said determining module comprises:
   means for calculating a direction in which a bubble of said first type and a bubble of said second type are adjacent, by using said alignment direction of said generated mesh and an element shape of the mesh; and
   means for generating an interbubble force in said direction.

11. The computer according to claim 10, wherein said module for inputting an alignment direction of a generated mesh includes means for calculating said alignment direction by using said geometric model.

12. A computer for generating a mesh comprising:
   a module for inputting a geometric model, which is an object of meshing;
   a module for generating a plurality of bubbles of a first type and a plurality of bubbles of a second type in a region of said geometric model;
   a module for determining a stable allocation of said bubbles by moving said bubbles according to an interbubble force defined by a predetermined rule, said interbubble force between a bubble of said first type and a bubble of said second type being different than said interbubble force between two bubbles of said first type, and by adjusting the maximum number of said bubbles of said first type, which are adjacent to one bubble of said second type, to four; and
   a module for generating the mesh by connecting the centers of bubbles of only said first type.

13. A storage medium for storing a program, said program comprising the steps of:
   inputting a geometric model, which is an object of meshing;
   generating a plurality of bubbles of a first type and a plurality of bubbles of a second type in a region of said geometric model;
   determining a stable allocation of said bubbles by moving said bubbles according to an interbubble force defined by a predetermined rule, said interbubble force between a bubble of said first type and a bubble of said second type being different than said interbubble force between two bubbles of said first type, and by controlling the bubble count of said bubbles of said first and second types to adjust a neighboring relationship between said bubbles of said first and second types; and
   generating the mesh by connecting the centers of bubbles of only said first type.

14. The storage medium according to claim 13, wherein said determining step includes a step of, if bubbles of a same type are adjacent, adding a bubble of a different type in a region enclosed by said bubbles of the same type.

15. The storage medium according to claim 13, wherein said determining step includes a step of, if two bubbles of a same type are adjacent, changing one of the adjacent bubbles of the same type to another type.

16. The storage medium according to claim 13, further comprising a step of inputting an alignment direction of a generated mesh, and wherein said determining step comprising the steps of:
   calculating a direction in which a bubble of said first type and a bubble of said second type are adjacent, employing said alignment direction for said generated mesh and an element shape of the mesh; and
   generating an interbubble force in said direction.

17. A storage medium for storing a program, said program comprising the steps of:
   inputting a geometric model, which is an object of meshing;
   generating a plurality of bubbles of a first type and a plurality of bubbles of a second type in a region of said geometric model;
   determining a stable allocation of said bubbles by moving said bubbles according to an interbubble force defined by a predetermined rule, said interbubble force between a bubble of said first type and a bubble of said second type being different than said interbubble force between two bubbles of said first type, and by adjusting the maximum number of said bubbles of said first type, which are adjacent to one bubble of said second type, to four; and
   generating the mesh by connecting the centers of bubbles of said first type.

* * * * *